(12) United States Patent
Raje et al.

(10) Patent No.: US 9,110,755 B2
(45) Date of Patent: Aug. 18, 2015

(54) AGGREGATION OF UPDATE SETS

(75) Inventors: Hrishikesh S. Raje, Seattle, WA (US); Mark Henriksen Phaedrus, Lake Forest Park, WA (US); Christopher S. Gouge, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 13/571,849

(22) Filed: Aug. 10, 2012

(65) Prior Publication Data

US 2014/0047426 A1 Feb. 13, 2014

(51) Int. Cl.
*G06F 9/44* (2006.01)
*G06F 9/445* (2006.01)
*G06F 15/177* (2006.01)

(52) U.S. Cl.
CPC ............... *G06F 8/65* (2013.01); *G06F 9/4411* (2013.01)

(58) Field of Classification Search
CPC ............... G06F 8/60; G06F 8/61; G06F 8/65; G06F 8/67; G06F 8/68; G06F 9/44505; G06F 11/4411
See application file for complete search history.

(56) References Cited

U.S. PATENT DOCUMENTS

| 6,904,592 | B1 * | 6/2005 | Johnson ........................ 717/168 |
| 6,931,523 | B1 | 8/2005 | Tomoson |
| 7,000,228 | B2 | 2/2006 | Mortazavi |
| 7,062,765 | B1 * | 6/2006 | Pitzel et al. .................... 717/177 |
| 7,743,374 | B2 | 6/2010 | Machida |
| 8,208,152 | B2 | 6/2012 | Hanson |
| 8,555,273 | B1 * | 10/2013 | Chia et al. ..................... 717/173 |
| 8,949,815 | B2 | 2/2015 | Phaedrus et al. |
| 2002/0129353 | A1 | 9/2002 | Williams et al. |
| 2003/0195951 | A1 | 10/2003 | Wittel et al. |
| 2003/0229890 | A1 * | 12/2003 | Lau et al. ....................... 717/168 |
| 2005/0091651 | A1 | 4/2005 | Curtis et al. |
| 2005/0268295 | A1 * | 12/2005 | Amodio et al. ............... 717/168 |
| 2006/0184927 | A1 | 8/2006 | Deblaquiere et al. |

(Continued)

FOREIGN PATENT DOCUMENTS

EP 1528751 5/2005

OTHER PUBLICATIONS

Iftekharh, "All New Windows Server '8' Hyper V Component Architecture Poster", retrieved at <<http://blogs.technet.com/b/iftekhar/default.aspx?p=2/default.aspx>>, Retrieved Date : May 21, 2012, pp. 49.

(Continued)

*Primary Examiner* — Don Wong
*Assistant Examiner* — Mohammad Kabir
(74) *Attorney, Agent, or Firm* — Bryan Webster; Kate Drakos; Micky Minhas

(57) ABSTRACT

Techniques for aggregation of update sets are described. In at least some implementations, techniques enable relationships between the updates to be created, managed, and applied in a variety of ways. For example, updates can be grouped in a set for installation on a computing device as an integrated set. Grouping updates in a set can be based on membership rules that specify whether a particular update may be grouped in a set, and conditions under which the particular update may be grouped in a set. Updates that are included in a set may be associated with interaction rules that specify how updates in the set interact as part of an installation process. In at least some implementations, membership rules and interaction rules for updates can be dynamically created, configured, and/or dynamically reconfigured.

20 Claims, 8 Drawing Sheets

(56) References Cited

U.S. PATENT DOCUMENTS

| | | | |
|---|---|---|---|
| 2006/0218545 | A1 | 9/2006 | Taguchi |
| 2007/0169101 | A1 | 7/2007 | Konersmann et al. |
| 2007/0180445 | A1 | 8/2007 | Greeff |
| 2008/0098094 | A1 | 4/2008 | Finkelstein et al. |
| 2008/0244555 | A1 | 10/2008 | Welvaert et al. |
| 2009/0307680 | A1 | 12/2009 | Trufinescu |
| 2011/0035738 | A1 | 2/2011 | Toeroe et al. |
| 2011/0145805 | A1* | 6/2011 | Taylor et al. .................. 717/168 |
| 2011/0179080 | A1 | 7/2011 | Miyazaki et al. |
| 2011/0252415 | A1* | 10/2011 | Ricci ............................ 717/173 |
| 2012/0017208 | A1 | 1/2012 | Lussier et al. |
| 2012/0089973 | A1 | 4/2012 | Bhat et al. |
| 2012/0278796 | A1 | 11/2012 | Sandlin et al. |
| 2014/0359592 | A1 | 12/2014 | Phaedrus et al. |

OTHER PUBLICATIONS

"Automatically get Recommended Drivers and Updates for Your Hardware", http://windows.microsoft.com/en-in/windows7/automatically-get-recommended-drivers-and-updates-for-your-hardware, Nov. 24, 2009, 4 pages.

"Driver Magician", Retrieved from <<http://www.drivermagician.com/>> on Apr. 12, 2013, 4 pages.

"Installing Device Drivers in Windows Vista", http://searchenterprisedesktop.techtarget.com/feature/Installing-device-drivers-in-Windows-Vista, Jan. 19, 2011, 15 pages.

"Installing Device Drivers without the Device being Present", http://cmb-it.blogspot.in/2008/05/installing-device-drivers-without.html, May 27, 2008, 5 pages.

"International Search Report and Written Opinion", Application No. PCT/US2013/060748, Feb. 25, 2014, 10 pages.

"Non-Final Office Action", U.S. Appl. No. 13/907,069, Apr. 8, 2014, 25 pages.

"Preinstalling a PnP Function Driver Package", Retrieved from <<http://msdn.microsoft.com/en-us/library/windows/hardware/ff549738(v=vs.85).aspx<< on Apr. 17, 2014, 2014, 2 pages.

"Windows Update Services: Client-Server Protocol", Retrieved from: <<http://download.microsoft.com/download/9/5/E/95EF66AF-9026-4BB0-A41D-A4F81802D92C/[MS-WUSP].pdf>> on Apr. 19, 2013, 183 pages.

Choudhary, "Automatically Updates Drivers in Windows 8", http://www.c-sharpcorner.com/UploadFile/6cde20/automatically-updates-drivers-in-windows-8/, May 23, 2012, 5 pages.

"Microsoft Announces Availability of Windows 8 Consumer Preview", Retrieved from <<http://www.microsoft.com/en-us/news/press/2012/feb12/02-29windows8cppr.aspx>>, Feb. 29, 2012, 2 pages.

"Notice of Allowance", U.S. Appl. No. 13/907,069, Sep. 19, 2014, 9 pages.

\* cited by examiner

AGGREGATION OF UPDATE SETS

BACKGROUND

Computing devices typically include various functionalities that can be updated from time to time. For example, a component device of a computing device (e.g., a graphics card, a data storage device, an input device, and so forth) can be associated with a device driver that enables the component device to function in the context of the computing device. A manufacturer or other entity associated with the component device can issue an update to the device driver, such as to fix a software bug, solve a compatibility issue, enhance functionality of the component device, and so on. The update can be installed on the computing device to replace or augment a previous version of the device driver.

Similarly, a software application installed on a computing device can be updated. For example, an operating system developer can issue an update to the operating system, such as to fix a security vulnerability, fix a bug, and so forth. Determining which updates to install on a computing device, and how to install the updates, involves a number of considerations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for aggregation of update sets are described. As discussed herein, updates can be retrieved for various functionalities, such as operating systems, applications, services, drivers, and so forth. In at least some implementations, techniques enable relationships between the updates to be created, managed, and applied in a variety of ways. For example, updates can be grouped in a set for installation on a computing device as an integrated set. Grouping updates in a set can be based on membership rules that specify whether a particular update may be grouped in a set, and conditions under which the particular update may be grouped in a set. In at least some implementations, membership rules for updates can be generated and/or applied to group a set of updates after the individual updates have been published and/or propagated to a target computing device.

Updates that are included in a set may be associated with interaction rules that specify how updates in the set interact as part of an installation process. For example, an interaction rule can specify that one update is to be installed before a different update is installed. Another interaction rule may specify that if installation of a particular update fails, a different update is not to be installed. Thus, a variety of different interaction rules can be specified to affect various installation-related behaviors for updates.

In at least some implementations, membership rules and interaction rules for updates can be dynamically created, configured, and/or dynamically reconfigured.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
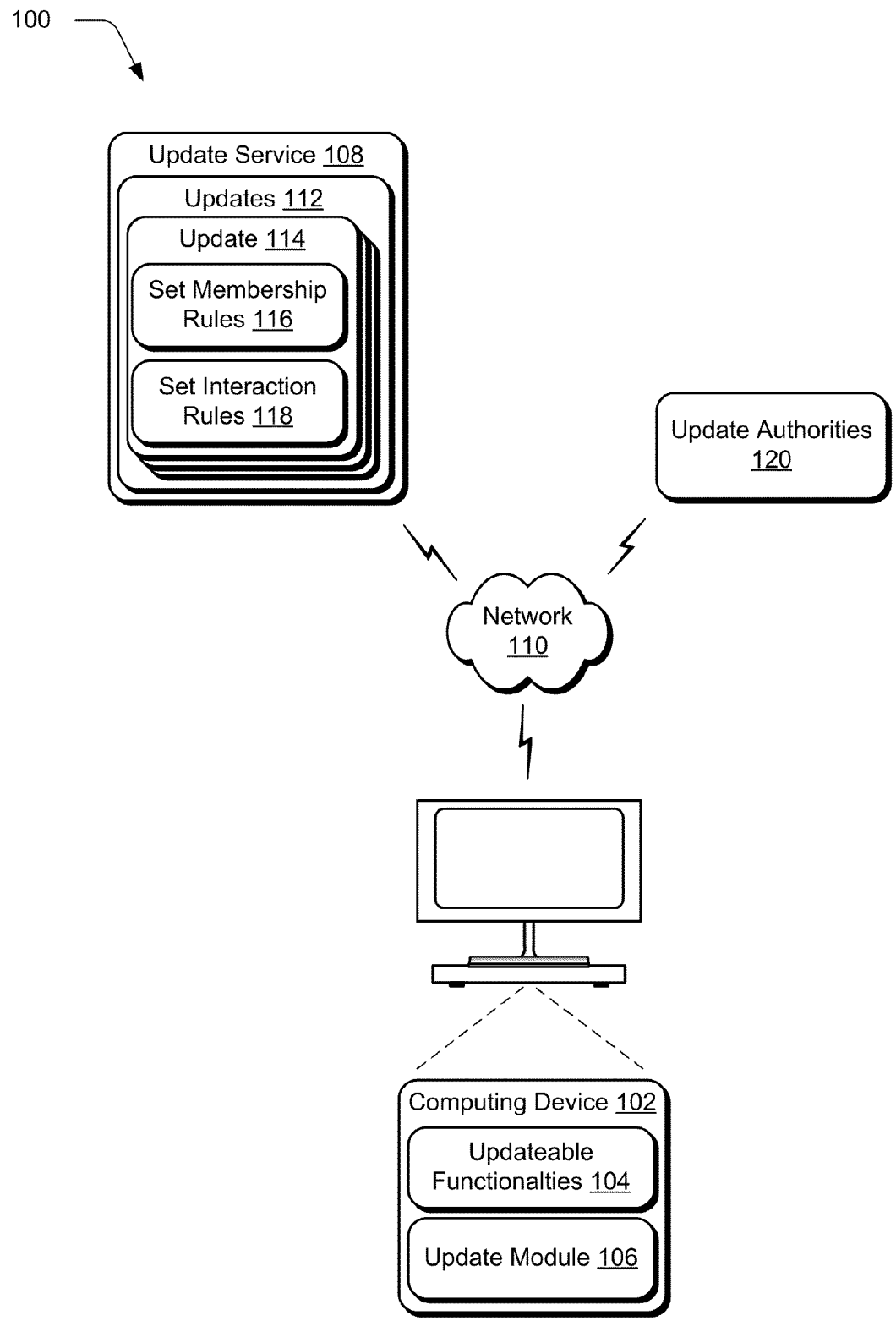
FIG. 1 is an illustration of an environment in an example implementation that is operable to employ techniques discussed herein.

Techniques for aggregation of update sets are described. As discussed herein, updates can be retrieved for various functionalities, such as operating systems, applications, services, drivers, and so forth. In at least some implementations, techniques enable relationships between the updates to be created, managed, and applied in a variety of ways. For example, updates can be grouped in a set for installation on a computing device as an integrated set. Grouping updates in a set can be based on membership rules that specify whether a particular update may be grouped in a set, and conditions under which the particular update may be grouped in a set. In at least some implementations, membership rules for updates can be generated and/or applied to group a set of updates after the individual updates have been published and/or propagated to a target computing device.

Updates that are included in a set may be associated with interaction rules that specify how updates in the set interact as part of an installation process. For example, an interaction rule can specify that one update is to be installed before a different update is installed. Another interaction rule may specify that if installation of a particular update fails, a different update is not to be installed. Thus, a variety of different interaction rules can be specified to affect various installation-related behaviors for updates.

In at least some implementations, membership rules and interaction rules for updates can be dynamically created and configured. For example, a collection of updates can be individually published by a particular entity or group of entities, such as a software developer, a device manufacturer, and so forth. An update service that manages updates for various computing devices can receive the updates, and can generate membership rules and/or interaction rules for the updates based on a variety of criteria. For instance, membership rules can be generated to account for operability issues that may arise if the updates are installed individually, such as conflicts between various functionalities. The membership rules can also specify that certain updates are to be grouped in a set to minimize disruption of a user experience that may be caused by multiple separate installation processes. Thus, membership rules may be applied after a particular collection of updates has been published and propagated to various services and/or devices to enable the updates to be grouped as a set.

In at least some implementations, membership rules and interaction rules for updates can be dynamically reconfigured. For example, membership rules that were previously generated for an update can be subsequently reconfigured. This can enable, for instance, a previously ungrouped update to be added to a set, or an update included as part of a set to be removed from the set. Further, previously-established interaction rules can be reconfigured to change interaction behavior between updates in a set. Thus, techniques can enable various update-related behaviors to be dynamically configured and reconfigured to determine whether and how particular updates are installed on a computing device.

In the following discussion, an example environment and example implementation scenarios are first described that are operable to employ techniques described herein. Example procedures involving techniques discussed herein are then described which may be employed in the example environment as well as in other environments. Accordingly, the example environments are not limited to performing the example procedures. Likewise, the example procedures are not limited to implementation in the example environment. Finally, an example system and device are described that are operable to employ techniques discussed herein in accordance with one or more embodiments.

Example Environment

FIG. 1 is an illustration of an environment 100 in an example implementation that is operable to employ techniques for aggregation of update sets discussed herein. Environment 100 includes a computing device 102 which can be embodied as any suitable computing device such as, by way of example and not limitation, a desktop computer, a portable computer (e.g., a laptop), mobile phone, tablet computer, and so forth. One of a variety of different examples of a computing device 102 is shown and described below in FIG. 8.

Included as part of the computing device 102 are updateable functionalities 104, which are representative of functionalities that can be updated in various ways. Examples of the updateable functionalities 104 include an operating system, applications, services, device drivers, firmware, and so forth. Thus, updates can be installed on and/or associated with the computing device 102 to augment and/or replace various portions of the updateable functionalities 104.

An update module 106 is provided, which is representative of functionality to manage update operations for the computing device 102. For instance, the update module 106 can determine that an update is available for the updateable functionalities 104. The update module 106 can enable the update to be retrieved (e.g., downloaded from a network resource) and installed on the computing device 102.

Further to embodiments, the computing device 102 is configured to communicate with an update service 108 via a network 110. The update service 108 is representative of functionality to manage updates for a variety of different computing devices (e.g., including the computing device 102), and to enable the updates to be provided to the computing devices. The update service 108 can be implemented as a network resource, such as via a web server. The network 110 may assume a wide variety of different configurations, such as the Internet, a wide area network (WAN), a local area network (LAN), a wireless network, a public telephone network, an intranet, and so on. Further, although a single network 110 is shown, the network 110 may be configured to include multiple networks. While various entities of the environment 100 are illustrated as communicating via the network 110, this is presented for purpose of example only. For instance, a wide variety of different communication channels other than the network 110 may be employed, such as to enable one group of entities to communicate via a different communication channel than another group.

The update service 108 includes updates 112, which are representative of updates that can be distributed and/or made available to different computing devices. Generally, the updates 112 can include software, computer code, executables (e.g., a binary), and so on, that can be used to augment or replace existing code and/or functionality.

The updates 112 include an example update 114, which in turn includes set membership rules 116 and set interaction rules 118. In at least some implementations, the set membership rules 116 and/or set interaction rules 118 are specific to the update 114. Alternatively or additionally, at least some of the set membership rules 116 and/or set interaction rules 118 can be utilized for others of the updates 112. For example, one or more of the set membership rules 116 and/or set interaction rules 118 can be globally applied to the updates 112.

According to various embodiments, the set membership rules 116 specify whether a particular update 112 may be included as part of a set of updates. If a particular update 112 may be included in a set, the set membership rules 116 can indicate various conditions that are to be met in order for the particular update 112 to be included in the set.

The set interaction rules 118 specify how a particular update 112 is to interact with other updates in a set of updates. For instance, the set interaction rules 118 can specify an installation order for a particular update 112 with relation to other updates in a set of updates. The set interaction rules 118 may also specify dependencies on other updates in a set, such as updates that are to be successfully installed before a particular update 112 may be installed. Thus, updates that are included as part of a set can be installed on the computing device 102 as a set and according to behaviors indicated in the set interaction rules 118. As detailed elsewhere herein, the set membership rules 116 and the set interaction rules 118 can be modified, such as dynamically and/or "on-the-fly," to affect various behaviors of the updates 112.

Further included as part of the environment 100 are update authorities 120, which are representative of entities that can publish and/or manage various types of updates. Examples of the update authorities 120 include device manufacturers, such as a manufacturer of the computing device 102 and/or of component devices of the computing device 102. The update authorities 120 may also include software developers and/or other entities that can develop and/or issue updates for various components and functionalities. For instance, the update authorities 120 can include manufacturers and/or other entities associated with the updateable functionalities 104. Other examples of the update authorities 120 include corporate administrators, contracted administrators, and other entities that are given the authority to specify and/or modify update-related behaviors, such as the set membership rules 116 and/or the set interaction rules 118. Thus, the update authorities 120 can publish and/or issue updates for the updateable functionalities 104, such as via the updates 112 managed by the update service 108. Alternatively or additionally, the update authorities can modify update-related behaviors, such as via modification of the set membership rules 116 and/or the set interaction rules 118.

The update authorities 120 may also specify and/or publish the set membership rules 116 and/or the set interaction rules 118. According to techniques discussed herein, the update authorities 120 and/or other entities may dynamically alter the set membership rules 116 and/or the set interaction rules 118. For example, the update authorities 120 may alter the set membership rules 116 and/or the set interaction rules 118 after the updates 112 have been published and/or distributed, such as to the update service 108 and/or the computing device 102.

Figure 2:
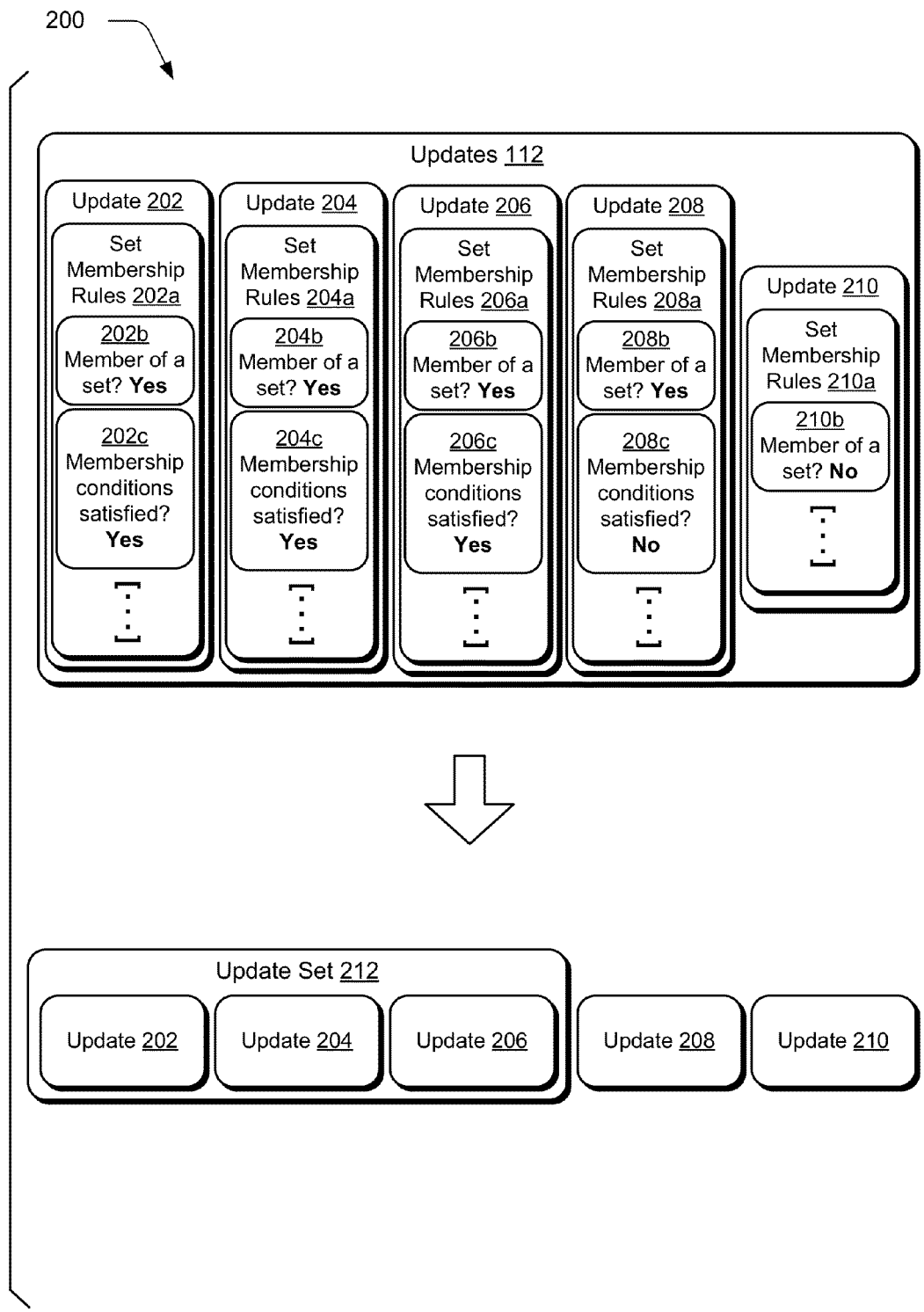
FIG. 2 illustrates an example implementation scenario in accordance with one or more embodiments.

FIG. 2 illustrates an example implementation scenario utilizing various aspects of the environment 100, generally at 200. Illustrated in the scenario 200 are the updates 112, which include a number of example updates and associated set membership rules for the respective updates.

Further to the scenario 200, the set membership rules for the respective updates 112 specify whether a particular update may be included as part of a set, and conditions that may cause a particular update to be included or excluded from a set. In at least some implementations, the set membership rules can be enforced and/or applied by various entities, such as the update module 106 of the computing device 102, the update service 108, and so on.

For instance, consider an update 202, which includes set membership rules 202a. The set membership rules 202a include a rule 202b which indicates whether the update 202 is permitted to be included as part of a set of updates. The rule 202b, for instance, may be implemented as a flag, such as "may be included in a set" or "not to be included in a set."

The set membership rules 202a further include a rule 202c, which specifies conditions under which the update 202 may be included as part of a set. The conditions, for instance, may specify various device attributes (e.g., for the computing device 102) that can cause the update 202 to be included or excluded from a set of updates. For example, the rule 202c can specify that if a device includes or does not include a particular attribute and/or set of attributes, the update 202 may or may not be included in a set of updates for the device.

Examples of such device attributes include identifying attributes of a computing device, such as a manufacturer (e.g., an original equipment manufacturer (OEM,)) for the computing device, a make for the computing device (e.g., the brand), a particular model of the computing device (e.g., a model number), and so forth. For example, a particular manufacturer can have multiple makes (e.g., brands) of computing devices. Further, a particular make of computing device can encompass multiple different models.

Such device attributes can also include a variety of other information, such as identifiers for component devices, such as a data storage device, input/output devices, processors, and so on. Device attributes may also include identifiers for software and/or firmware installed on the computing device 102. Attributes specified by the rule 202c may also specify different state conditions, such as device driver versions that are installed on a device, application versions that are installed on a device, available memory, and so on.

The rule 202c can further identify other updates with which the update 202 may or may not be grouped in a set. For instance, the rule 202c can specify that if a particular update is included in a set, the update 202 may be grouped in that set. Additionally or alternatively, the rule 202c may specify that the update 202 may not be grouped with a particular update or group of updates in a set.

These conditions and attributes are presented for purpose of example only, and a wide variety of different conditions, attributes, and states may be considered in determining whether an update may be included as part of a set in accordance with one or more embodiments. Further, the rules 202b, 202c are presented as examples only, and set membership rules can include additional and/or alternative rules that specify whether a particular update may be included as part of a set.

In this particular example, the conditions specified by the rule 202c are satisfied, and thus the update 202 may be included as part of a set. The update module 106, for instance, can determine that device state for the computing device 102 corresponds to conditions specified by the rule 202c. Thus, the update 202 may be included as part of a set of updates for the computing device 102.

The other updates include their own particular set membership rules. For instance, an update 204 includes set membership rules 204a, including rules 204b and 204c. The rule 204b indicates that the update 204 may be included as part of a set, and conditions indicated by the rule 204c are satisfied. Thus, the update 204 may be included as part of a set. Similarly, an update 206 includes set membership rules 206a, including rules 206b and 206c. The rule 206b indicates that the update 206 may be included as part of a set, and conditions indicated by the rule 206c are satisfied. Thus, the update 206 may be included as part of a set.

Further included as part of the updates 112 is an update 208, which includes set membership rules 208a. A rule 208b of the set membership rules 208a indicates that the update 208 may be included as part of a set of updates. A rule 208c specifies conditions under which the update 208 may be included in a set. In this particular example, evaluation of the rule 208c indicates that conditions are such that the update 208 may not be included as part of a set. Thus, the update 208 may be presented as an individual update, or may be withheld from presentation as an available update.

The updates 112 further include an update 210, which includes set membership rules 210a. A rule 210b of the set membership rules specifies that the update 210 may not be included as part of a set. Thus, in at least some implementations, the update 210 may be made available as an individual update.

Continuing to the lower portion of the scenario 200, the updates 202, 204, and 206 are grouped in an update set 212. The update set 212 can be installed on a device (e.g., the computing device 102) as a set. Further, the updates 208, 210 can be presented individually for installation on a device.

While a single update set 212 is illustrated, it is to be appreciated that techniques discussed herein may be employed to create multiple different sets, and to create relationships between different sets. For example, based on particular set membership rules and/or set interaction rules, updates can be grouped into different sets. Conflicting set interaction rules for a particular set of updates, for instance, can cause the set of updates to be separated into two or more different sets that can be related by the set interaction rules.

Having discussed implementations of some example set membership rules, consider now some example set interactions rules in accordance with one or more embodiments.

Figure 3:
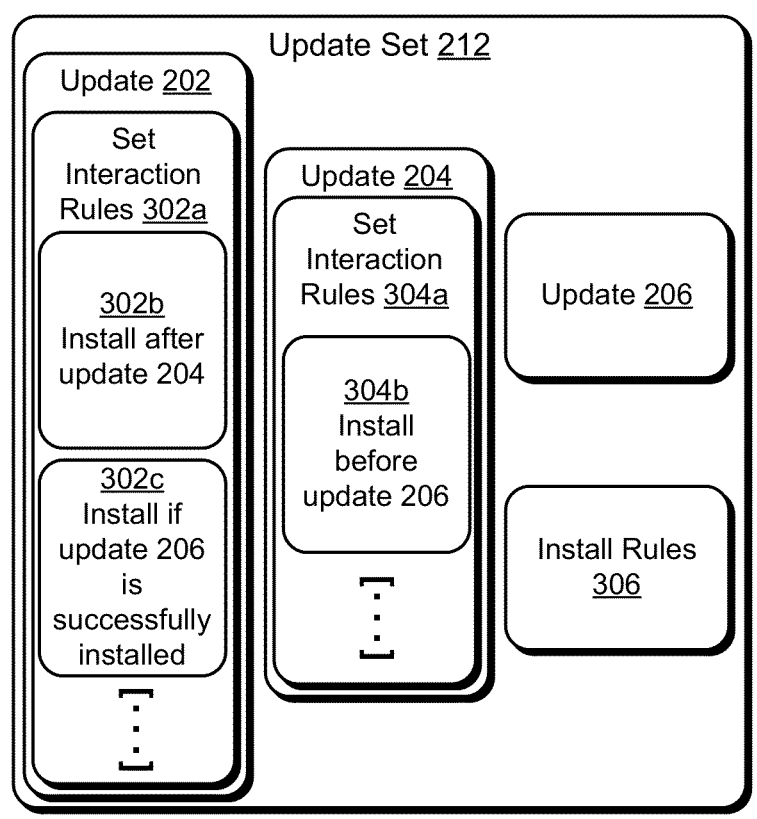
FIG. 3 illustrates an example implementation scenario in accordance with one or more embodiments.

FIG. 3 illustrates an example implementation scenario utilizing various aspects of the environment 100 and the scenario 200, generally at 300. The scenario 300 includes the update set 212, which in turn includes the updates 202, 204, and 206. Each of the updates in turn includes respective set interaction rules.

For example, the update 202 includes set interaction rules 302a, which include rules 302b and 302c. The rule 302b specifies that the update 202 is to be installed after the update 204, and the rule 302c specifies that the update 202 is to be installed if the update 206 is successfully installed.

The update 204 includes set interaction rules 304a, which include a rule 304b. The rule 304b specifies that the update 204 is to be installed before the update 206. The update 206 does not include any explicit set interaction rules.

Based at least in part of the set interaction rules for the respective updates of the update set 212, install rules 306 are generated. The install rules 306 specify overall install conditions for installation of the updates of the update set 212. For instance, the install rules 306 can specify an order in which the updates of the set 212 are to be installed. With reference to the example set interaction rules discussed above, the install rules 306 can specify that the update 204 is to be installed first, followed by the update 206. The install rules 306 can further specify that if the update 206 is successfully installed, the update 202 can then be installed. However, if the update 206 is not successfully installed (e.g., an error occurs during its installation), the update 204 may not be installed.

The install rules 306 can include a variety of other install conditions and parameters for the installation of the update set 212. For instance, the install rules 306 can specify that if installation of any of the constituent updates fails, installation of the entire update set 212 fails. Alternatively, the install rules 306 can specify that if installation of any of the constituent updates fails, the remaining updates of the update set 212 can be presented as individual updates for installation. As another option, the install rules 306 can specify that if installation of any of the constituent updates fails, the remaining updates of the update set 212 may be installed as a set.

The install rules 306 may also include presentation parameters for the update set 212, such as a display name for the update set 212 and/or other graphical features for presentation of the update set 212.

The set membership rules and set interaction rules referenced above can be generated by a variety of different entities, such as the update authorities 120, the update service 108, and/or the update module 106. The set membership rules and set interaction rules can also be maintained in a variety of different ways and/or locations, such as part of their respective updates, as files separate from the updates stored by a resource such as the update service 108 and/or the computing device 102, and so forth. For example, metadata within a particular update can reference a remote location where set membership rules and/or set interaction rules can be retrieved for the update. This can enable an entity to make changes to the rules without having to access an actual instance of the update at a particular device.

In at least one embodiment, the set membership rules and/or the set interaction rules can be generated and maintained by the update service 108. Further, modifications to the set membership rules and/or the set interaction rules can be made via the update service 108, such as after respective updates have been published to the update service 108 and/or the computing device 102.

Having described an example environment and example implementation scenarios in which the techniques described herein may operate, consider now a discussion of some example procedures in accordance with one or more embodiments.

Example Procedures

The following discussion describes example procedures for aggregation of update sets in accordance with one or more embodiments. In portions of the following discussion, reference will be made to the environment 100 of FIG. 1, and the implementation scenarios 200 and 300 of FIGS. 2 and 3. In at least some embodiments, aspects of the procedures may be implemented via entities discussed above, such as the update module 106 and/or the update service 108.

Figure 4:
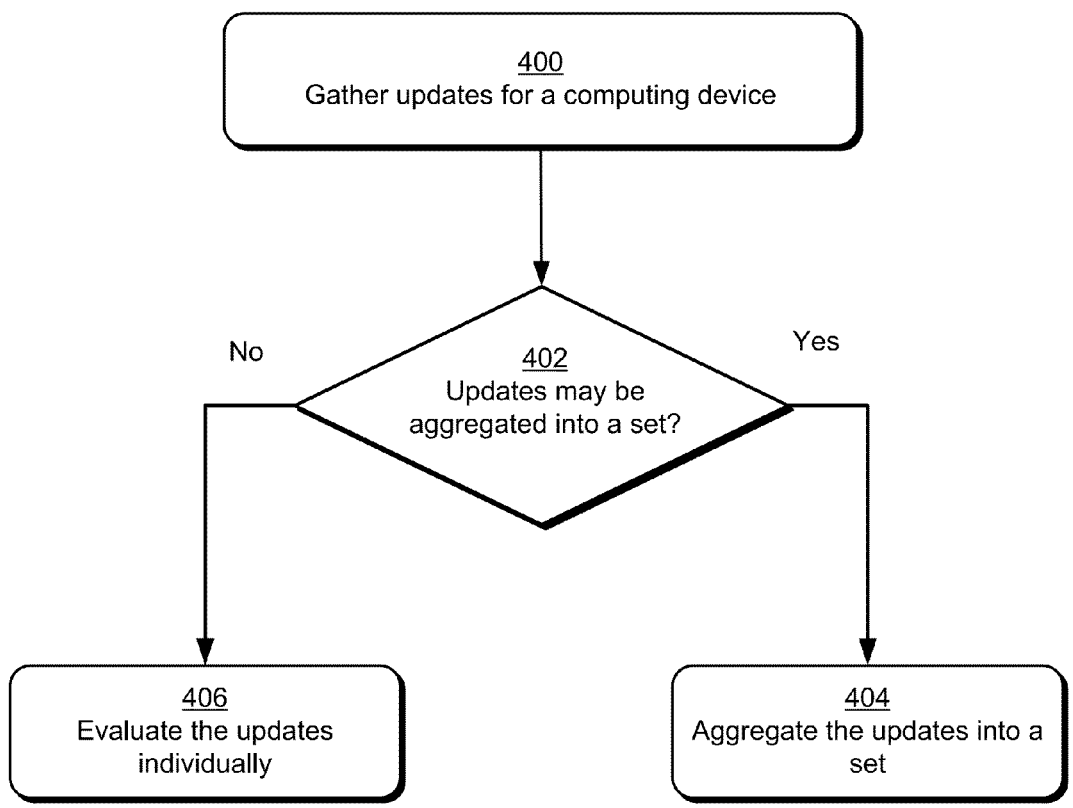
FIG. 4 is a flow diagram that describes steps in a method in accordance with one or more embodiments.

FIG. 4 is a flow diagram that describes steps in a method in accordance with one or more embodiments. Step 400 gathers updates for a computing device. For instance, the updates can be gathered in response to a query by the update module 106 to the update service 108 for updates for the updateable functionalities 104. In at least some implementations, the query can include various device attributes that can enable updates to be located, such as identifiers for the updateable functionalities 104, device state information, and so on. Examples of device attributes are discussed above. Alternatively or additionally, the updates can be gathered by the update service 108 and pushed to the computing device 102, e.g., independent of a query from the computing device 102.

Step 402 ascertains whether the updates may be aggregated into a set. For example, the update module 106 and/or the update service 108 can determine based on the set membership rules 116 for the respective updates, whether the updates may be grouped in a set for installation as a set on the computing device 102. As discussed above, the set membership rules can include an explicit indication that particular updates may or may not be included as part of a set. The set membership rules may also specify certain conditions under which particular updates may or may not be included as part of a set, such as based on device attributes for the computing device 102, other updates with which a particular update may or may not be grouped in a set, and so forth.

In at least some implementations, ascertaining whether updates may be aggregated into a set can occur after the updates have been individually published and distributed, such as after the updates 112 have been provided from the update authorities 120 to the update service 108 and/or the computing device 102. For example, the update module 106 can evaluate the set membership rules 116 after the initiation of an update process to ascertain whether the updates 112 may be grouped in a set. Thus, whether or not a particular update is grouped in a set can depend on dynamic device state conditions that may change after the update is published by one of the update authorities 120.

If the updates may be aggregated into a set ("Yes"), step 404 aggregates the updates into a set. For example, updates can be grouped in a set, such as by the update module 106 and/or the update service 108, for installation on the computing device 102. In at least some embodiments, a notification can be presented that the set of updates will be installed. For instance, when updates are grouped into a set for installation, a user may be prevented from initiating installation of individual updates of the set without allowing installation of the entire set. Thus, in at least some implementations, updates in a set may be installed as a set, or not at all.

If the updates may not be aggregated into a set ("No"), step 406 evaluates the updates individually. For example, the updates 112 can be evaluated individually to determine whether or not each of the updates is to be installed on the computing device 102. An individual update, for instance, can be presented to a user for install approval, such as via a user interface that includes a user-selectable option for approving installation of an update.

In at least some implementations, a particular group of updates may be aggregated into a set for installation on one device, but may not be aggregated on a different device. For example, device attributes on one device may be such that set membership rules for a group of updates indicate that the updates are to be aggregated into a set for installation on the device. Device attributes for a different device, however, may be such that the same set membership rules indicate that the updates are not to be aggregated into a set for installation on the device. For example, the updates may be presented individually for installation on the different device. Thus, set membership rules can be employed to dynamically control aggregation of updates on different devices.

Figure 5:
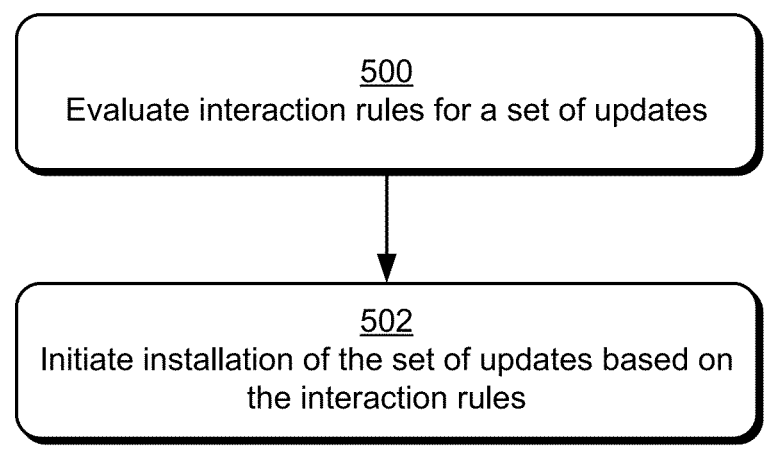
FIG. 5 is a flow diagram that describes steps in a method in accordance with one or more embodiments.

FIG. 5 is a flow diagram that describes steps in a method in accordance with one or more embodiments. In at least some implementations, the method describes an example extension of the method described above with reference to FIG. 4.

Step 500 evaluates interaction rules for a set of updates. For instance, the update module 106 and/or the update service 108 can evaluate the set interaction rules for the update set 212. Step 502 initiates installation of the set of updates based on the interaction rules. For example, the update module 106 and/or the update service 108 can generate the install rules 306 based on the set interaction rules for the update set 212, and can proceed with installation of the updates of the update set 212 based on the install rules 306. In at least some implementations, updates of the update set 212 can be installed as part of a single (e.g., a continuous) update install operation.

Figure 6:
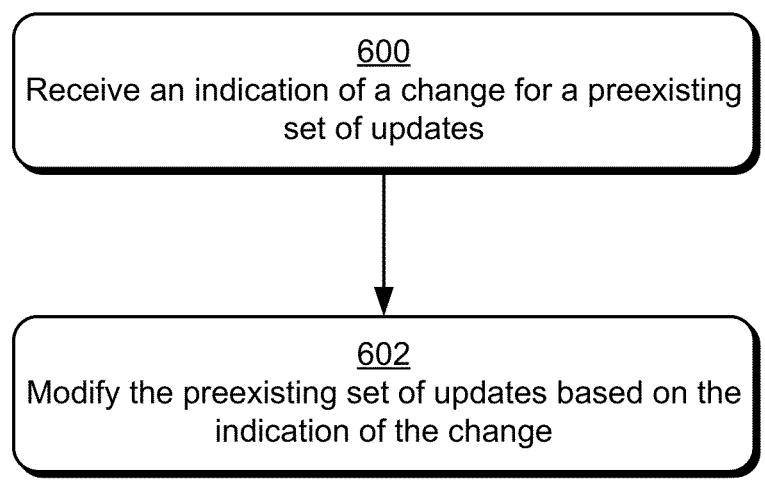
FIG. 6 is a flow diagram that describes steps in a method in accordance with one or more embodiments.

FIG. 6 is a flow diagram that describes steps in a method in accordance with one or more embodiments. In at least some implementations, the method describes example ways of dynamically altering a set of updates.

Step 600 receives an indication of a change for a preexisting set of updates. The update service 108 and/or the computing device 102, for instance, can receive an update from the update authorities 120. Set membership rules for the update can specify that the update may be included in a set. Alternatively, the indication can specify that a particular update is to be removed from a set. For example, the update authorities can notify the update service 108 and/or the update module 106 that the update is to be removed from a set, and/or deleted.

Step 602 modifies the preexisting set of updates based on the indication of the change. For instance, based on set membership rules and/or other aspects of the update, the update can be grouped with a set of updates that was previously aggregated. The set membership rules, for example, can identify a different update with which the update is to be grouped. Thus, the update can be grouped in a preexisting set that includes the different update. For instance, the update can be added to the preexisting set by the update module 106 and/or the update service 108.

Alternatively, an update can be removed from the preexisting set, such as prior to initiation of the installation of the set. Thus, a set of updates can be dynamically altered, such as via addition and/or removal of updates from the set.

Figure 7:
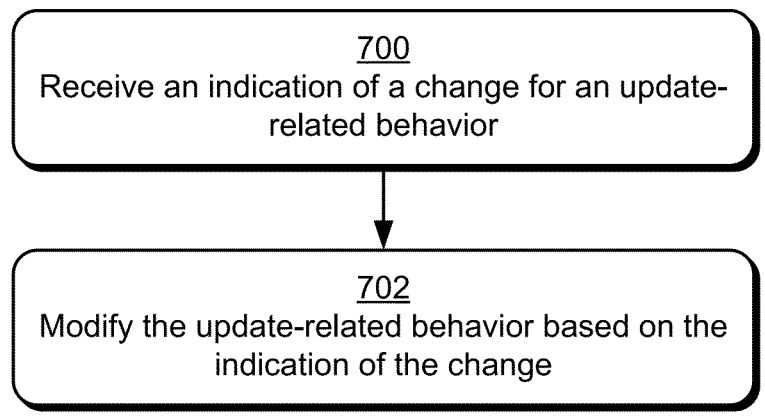
FIG. 7 is a flow diagram that describes steps in a method in accordance with one or more embodiments.

FIG. 7 is a flow diagram that describes steps in a method in accordance with one or more embodiments. In at least some implementations, the method describes example ways of dynamically altering update-related behaviors.

Step 700 receives an indication of a change for an update-related behavior. The change, for instance, can include a change for one or more of the set membership rules 116 and/or the set interaction rules 118. For example, the indication can be based on a notification from the update authorities 120 and/or the update service 108.

Step 702 modifies the update-related behavior based on the indication of the change. The update service 108 and/or the update module 106, for instance, can modify the set membership rules 116 and/or the set interaction rules 118 based on the indication. In at least some implementations, the modification can apply to an update that has been previously grouped in a set of updates. For example, the modification can cause a change in how the update interacts with other updates in the set. As referenced above, the modification may also cause a particular update to be grouped or excluded from a set.

Thus, various update-related behaviors can be dynamically modified, such as after a particular update has been published and propagated to a target device. This can enable various entities, such as the update service 108 and/or the update authorities 120, to respond to a variety of dynamically changing conditions in determining whether to group particular updates in a set, and in specifying interaction behaviors between updates.

Having discussed some example procedures, consider now a discussion of an example system and device in accordance with one or more embodiments.

Example System and Device

Figure 8:
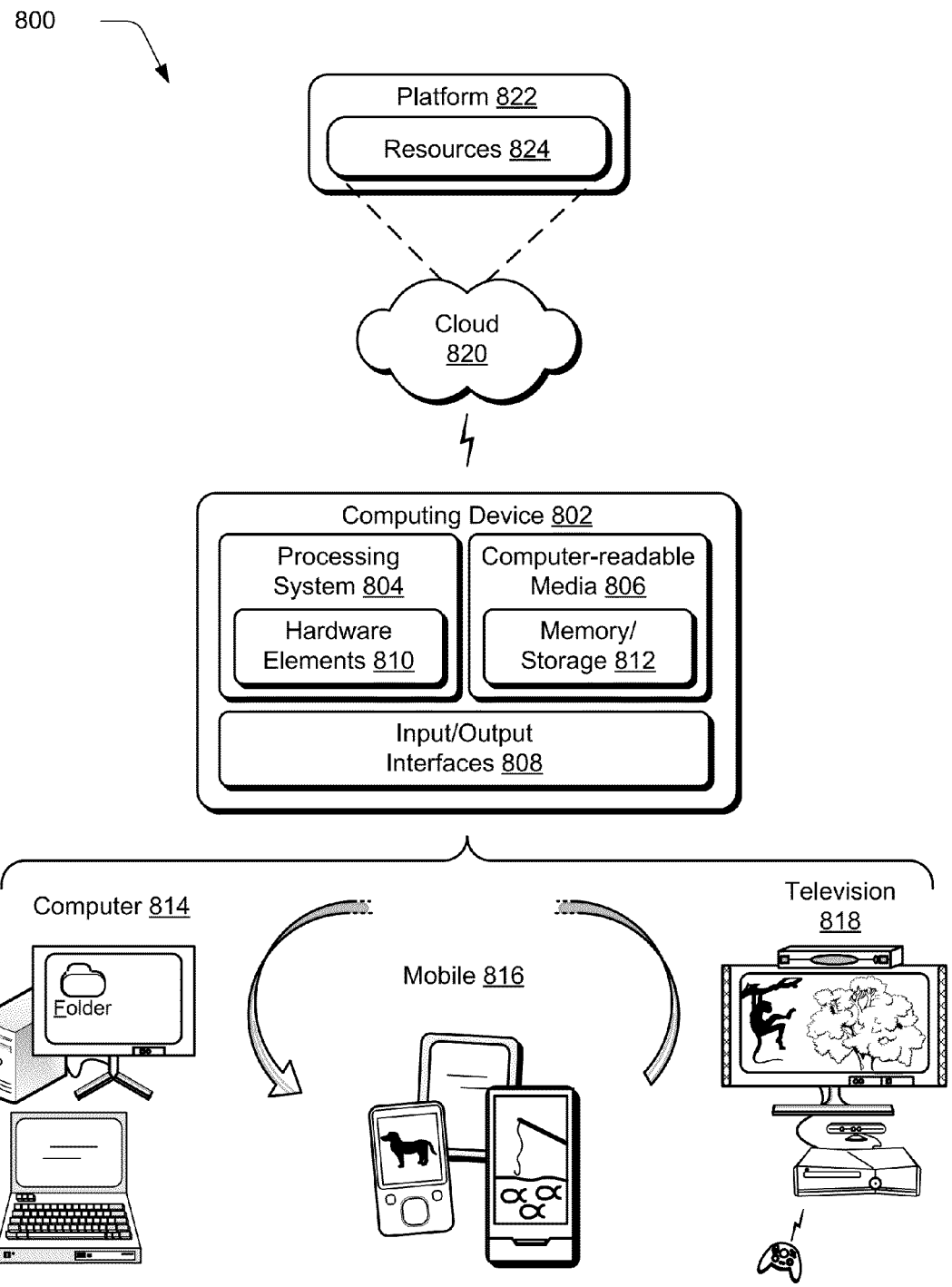
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the computing device 102 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more I/O Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "rule," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media does not include signal bearing or transitory media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as an module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the update module 106 and/or the update service 108 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for aggregation of update sets are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
    gathering updates for a computing device;
    ascertaining, based on one or more set membership rules for the updates and one or more state conditions of the computing device, that at least some of the updates may be aggregated into a set of updates for installation as a set on the computing device and that at least one of the updates may not be aggregated into a set of updates; and
    making the at least one of the updates that may not be aggregated available as an individual update to the computing device.

2. A method as described in claim 1, wherein said gathering is responsive to a query from the computing device to an update service for updates for updateable functionalities of the computing device, the query including one or more attributes of the computing device.

3. A method as described in claim 2, wherein the updateable functionalities comprise one or more of an operating system, an application, or a device driver.

4. A method as described in claim 1, wherein one or more of the set membership rules include an indication of whether one or more of the updates are permitted to be aggregated into the set of updates.

5. A method as described in claim 1, wherein one or more of the set membership rules specify particular state conditions of the computing device under which one or more of the updates may be aggregated into the set of updates.

6. A method as described in claim 1, wherein the state conditions comprise one or more dynamic state conditions of the computing device, and the one or more dynamic state conditions comprise at least one of a software state or a hardware state for the computing device.

7. A method as described in claim 1, wherein one or more of the set membership rules specify at least one of:
    if the computing device includes a particular state condition, one or more of the updates may be aggregated into the set of updates; or
    if the computing device does not include a particular state condition, one or more of the updates may not be aggregated into the set of updates.

8. A method as described in claim 1, further comprising:
    aggregating the at least some of the updates into the set of updates based on the one or more state conditions satisfying one or more of the set membership rules; and
    enabling installation of the set of updates based on one or more interaction rules for the set of updates.

9. A method as described in claim 1, further comprising:
    evaluating the at least one of the updates that may not be aggregated for individual installation on the computing device.

10. A method as described in claim 1, further comprising:
    aggregating the at least some of the updates into the set of updates based on the one or more state conditions satisfying one or more of the set membership rules;
    receiving an indication of a change to one or more of the set membership rules; and
    causing at least one of: an update to be removed from or an update to be added to the set of updates based on the indication of the change and prior to installation of the set of updates.

11. A system comprising:
    one or more processors; and
    one or more computer-readable storage media having instructions stored thereon that, responsive to execution by the one or more processors, cause the one or more processors to perform operations comprising:
        receiving updates for a computing device from a remote resource;
        aggregating, based on one or more set membership rules for the updates and one or more attributes of the computing device, at least some of the updates into a set of updates for installation as a set on the computing device; and
        enabling installation of the set of updates based on one or more interaction rules that define one or more installation relationships between two updates of the set of updates, the installation relationships specifying at least one of an order in which one or more updates of the set of updates is to be installed or an install condition of at least one of the updates of the set of updates that is dependent on the installation of at least one other update of the set of updates.

12. A system as recited in claim 11, wherein the one or more set membership rules specify that based on the one or more attributes of the computing device, the at least some updates may be aggregated into the set of updates.

13. A system as recited in claim 11, wherein one or more of the set membership rules specify that at least one of the updates may not be aggregated into the set of updates, and wherein the operations further comprise initiating installation of the at least one update as an individual update.

14. A system as recited in claim 11, wherein the operations further comprise:
   receiving an indication of a change to one or more of the set membership rules after the at least some updates are aggregated into the set of updates; and
   causing at least one of: an update to be removed from the set of updates, or an update to be added to the set of updates, based on the indication of the change.

15. A system as recited in claim 11, wherein the operations further comprise:
   receiving an indication of a change in one or more of the attributes of the computing device after the at least some updates are aggregated into the set of updates; and
   causing at least one of: an update to be removed from the set of updates, or an update to be added to the set of updates, based on the indication of the change.

16. A computer-implemented method, comprising:
   aggregating at a computing device, based on one or more set membership rules and one or more attributes of the computing device, at least some of a plurality of updates into a set of updates for installation as a set on the computing device;
   receiving at the computing device an indication of a change for the set of updates;
   based on the indication, modifying the set of updates at the computing device by at least one of:
      adding an update to the set of updates;
      removing an update from the set of updates; or
      changing at least one set interaction rule for the set of updates; and
   initiating installation of the set of updates based on one or more interaction rules that define one or more installation relationships between two updates of the set of updates, the installation relationships specifying at least one of an order in which one or more updates of the set of updates is to be installed or an install condition of at least one of the updates of the set of updates that is dependent on the installation of at least one other update of the set of updates.

17. A computer-implemented method as described in claim 16, wherein the indication of the change includes a change to one or more set membership rules for the set of updates.

18. A computer-implemented method as described in claim 16, wherein the indication of the change includes a change to one or more attributes of the computing device, the attributes including at least one of a software state or a hardware state of the computing device.

19. A computer-implemented method as described in claim 16, wherein the install condition comprises the successful installation of at least one other update of the set of updates.

20. A computer-implemented method as described in claim 19, wherein if the install condition is not met, the entire set of updates fails installation.

* * * * *